United States Patent [19]

Ufken et al.

[11] 4,099,937
[45] Jul. 11, 1978

[54] AUTOMATIC DUMPING ROOF DRILL DUST COLLECTOR

[75] Inventors: Gregory Allen Ufken; Jon Arthur Ruopsa, both of Minneapolis, Minn.

[73] Assignee: Donaldson Company, Inc., Minneapolis, Minn.

[21] Appl. No.: 743,226

[22] Filed: Nov. 19, 1976

[51] Int. Cl.² ............................................. B01D 50/00
[52] U.S. Cl. .................................. 55/212; 55/218; 55/271; 55/283; 55/288; 55/319; 55/337; 55/431; 55/422; 55/432; 55/DIG. 3; 175/206
[58] Field of Search ............. 55/210, 211, 212, 218, 55/242, 271, 272, 283, 288, 302, 319, 325, 326, 328, 332, 337, 385 R, 385 D, 431, 432, DIG. 3, 422; 175/206, 209, 66

[56] References Cited

U.S. PATENT DOCUMENTS

| 1,743,934 | 1/1930 | Ruemelin | 55/319 |
|---|---|---|---|
| 2,802,543 | 8/1957 | Clark | 55/242 |
| 2,975,847 | 3/1961 | Feucht | 175/206 |
| 2,990,032 | 6/1961 | Sandvig | 55/325 |
| 3,078,646 | 2/1963 | Leech et al. | 55/96 |
| 3,653,190 | 4/1972 | Lee et al. | 55/337 |
| 3,735,566 | 5/1973 | Laliwala | 55/283 |
| 3,910,360 | 10/1975 | Sundstrom | 55/283 |
| 3,955,236 | 5/1976 | Mekelburg | 55/319 |
| 3,960,526 | 6/1976 | Andrews | 55/431 |
| 4,007,026 | 2/1977 | Groh | 55/DIG. 3 |

FOREIGN PATENT DOCUMENTS 2,351,208   4/1975   Fed. Rep. of Germany ... 55/DIG. 3

OTHER PUBLICATIONS

Donaldson Roof Drill Dust Collector, Donaldson Company, Inc., 1400 West 94th Street Minneapolis, Minnesota, Box 1299, 55440, copyright 1975.

*Primary Examiner*—Frank W. Lutter
*Assistant Examiner*—David L. Lacey
*Attorney, Agent, or Firm*—Merchant, Gould, Smith, Edell, Welter & Schmidt

[57] ABSTRACT

A roof drill dust collector is disclosed which comprises a closed housing in which dust-laden air is carried through a first stage dust separator, a second stage dust separator, and a third stage dust filter, before being expelled to open air. The first and second stage separators deposit dust in first and second collection chambers having a common floor, being a hinged door. The housing has means therein for automatically, in sequence, spraying streams of water on the collection chamber walls, opening the hinged door to dump the collected dust, sending a reverse pulse of air through the third stage filter, and closing the hinged door.

12 Claims, 8 Drawing Figures

AUTOMATIC DUMPING ROOF DRILL DUST COLLECTOR

BACKGROUND OF THE INVENTION

1. Field of the Invention

This invention relates to the field of dust collection devices. More particularly, this invention relates to the field of self-cleaning and self-emptying collectors for dust generated by the drilling of bolt holes in mine ceilings.

2. Description of the Prior Art

In underground mining situations, it is frequently desired to place a plurality of expansion bolts into the mine ceiling for support. The placement of bolts requires that appropriate holes be drilled in the roof as a preparatory step. This drilling operation creates large quantities of dust which can make working conditions within the mine intolerable and unhealthy, particularly so for the drill operator.

For these reasons, devices have been developed to carry the dust generated by drilling away from the drill site, where the drill operator is positioned. Typically, such devices comprise a hollow drill rod with at least one hole therein adjacent the drill bit, which drill rod communicates with some type of suction device, such as a venturi, having an outlet at a point remote from the drill operator.

Devices have further been developed to filter the air sucked away from the drill site before returning it to the mine environment. These devices have frequently been of the single stage type, such as, for instance, a chamber having a plurality of baffle plates therein over which the dust-laden air passes. In such collectors, the dust impinges upon the baffle plates and is thus removed from the air stream which flows back into the open air.

It has become known that multi-stage filtering devices are more effective than their single-stage counterparts, and such devices have been developed to filter out and collect the dust generated by roof drilling operations. The Donaldson Company, Inc., Series RDX00-4545 roof drill dust collector is an example of such a device.

Up until the time of the present invention, however, even such multi-stage units have not proved entirely satisfactory. The primary cause of dissatisfaction has stemmed from the fact that such units have a limited dust storage capacity. This means that a drill operator using a conventional collector has to determine how many holes he can drill before his dust collector is full, and he must then keep track of the number of holes drilled as he goes along, stopping to manually empty the dust collector when it is full. This not only means that he must leave the drilling site, thus losing drill time, but also means that he must expose himself to the clouds of dust he has been trying to avoid, by manually dumping the dust from the collector to the mine floor.

No prior art devices known to the inventor combine an air cleaning device, particularly a multi-stage air cleaning device, with means for automatically cleaning the device and emptying collected dust from the device.

SUMMARY OF THE INVENTION

In view of the foregoing, it is a feature of the present invention that a roof drill dust collector is provided having efficient multi-stage air cleaning capability.

Another feature of the present invention is that means are provided for automatically emptying and cleaning the storage chambers of the dust collector without the need for the drill operator to manually intercede in such operations.

Still another feature of the present invention is the provision for access to each of the various cleaning stages of the dust collector, in order to facilitate maintenance.

It is a further feature of the device of the present invention that it is compact and easily adaptable for mounting on conventional mining equipment used in conjunction with bolt hole drilling.

These and other features of the invention are accomplished by providing a substantially closed housing having an inlet to which is attached a hose running to the drill site and communicating with the bore of the hollow drill rod. The housing further has an outlet to which is attached a blower by means of another hose. When the blower is activated, it draws air through the drill rod, into the housing, through a series of cleaning stages located therein, out of the housing, and back into the mine environment. Within the housing, there are provided an expansion chamber, a filter chamber, and two dust collection chambers.

When dust-laden air enters the housing, it first passes into a first stage separator mounted in the expansion chamber. Dust separated in the first stage is deposited in the first collection chamber. The air then passes from the first stage into the expansion chamber, and from there into a second stage separator. Dust separated in the second stage is deposited in the second collection chamber, and the normal air flow carries any remaining dust into the filter chamber, where it passes through a filter element before clean air passes out of the housing.

The housing is provided with a trap door which forms the floor of the dust collection chambers, water nozzles directed at the interior walls of the collection chambers, and a reverse pulse air jet adjacent the filter chamber outlet. Control means within the housing, activatable by the drill operator from his remote site, eliminate the vacuum within the housing, spray water into the collection chambers to wash down the walls, open the trap wall to dump the collected dust, send a reverse air pulse through the dust filter to prevent restriction therein, shut off the water and close the trap door, and recreate the housing vacuum, whereby the dust collector can be operated continuously without the necessity of the drill operator stopping frequently to manually empty the collector.

A side door is also provided in the housing for easy access to the first and second stage separators and the dust filter, all of which are removable for maintenance.

An improvement over prior multi-stage collectors in the present device is the fact that the dust filter, being generally cylindrical, is mounted vertically within the filter chamber, thus allowing the housing to have a narrower profile than in previous collectors, with the result that the device of the present invention is readily adaptable for mounting on existing machines used for drilling roof bolt holes in cramped quarters. The filter is hingeably mounted in the filter chamber, whereby it may be swung outwardly towards the side door of the housing for easy access.

DESCRIPTION OF THE PREFERRED EMBODIMENT

Figure 1:
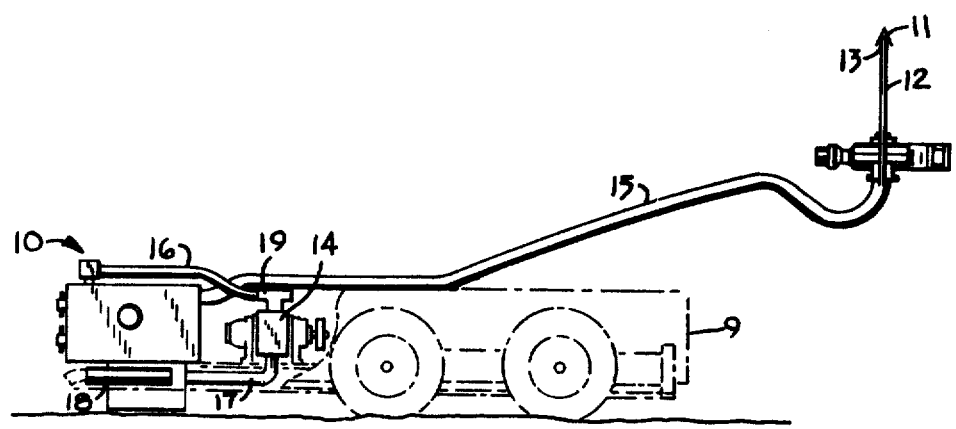
FIG. 1 is a side elevation showing the present invention mounted on a machine used in the drilling of roof bolt holes.

Referring now to FIG. 1, there is shown the roof drill dust collector of the present invention, generally designated by the numeral 10, mounted on a typical single arm bolter 9. Dust is created initially by the cutting action of the drill bit 11, which produces a large mass of fine particles. These particles are carried into hollow drill rod 12 through a dust port 13, just under drill bit 11, by air being pulled through the dust collecting system with a positive displacement blower 14.

Captured dust and air are carried into dust collector 10 through intake hose 15. Clean air passes on from dust collector 10, through outlet hose 16, blower 14, second outlet hose 17, and muffler 18, to the mine atmosphere.

A blower air release valve 19 is placed in the airline to protect blower 14. If the dust collection system plugs, relief valve 19 will open and clean air will be pulled directly into suction blower 14.

Figure 2:
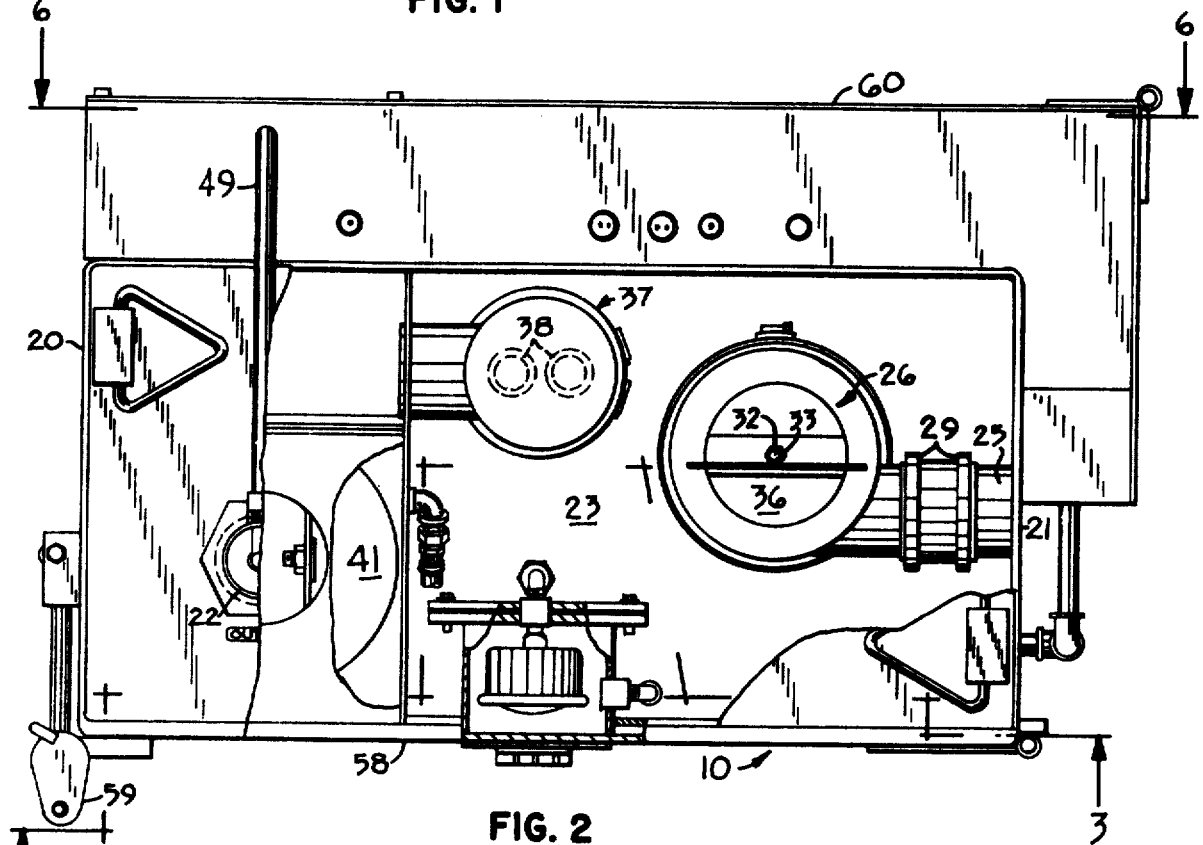
FIG. 2 is a top plan view of the present invention, with portions thereof broken away.
Figure 3:
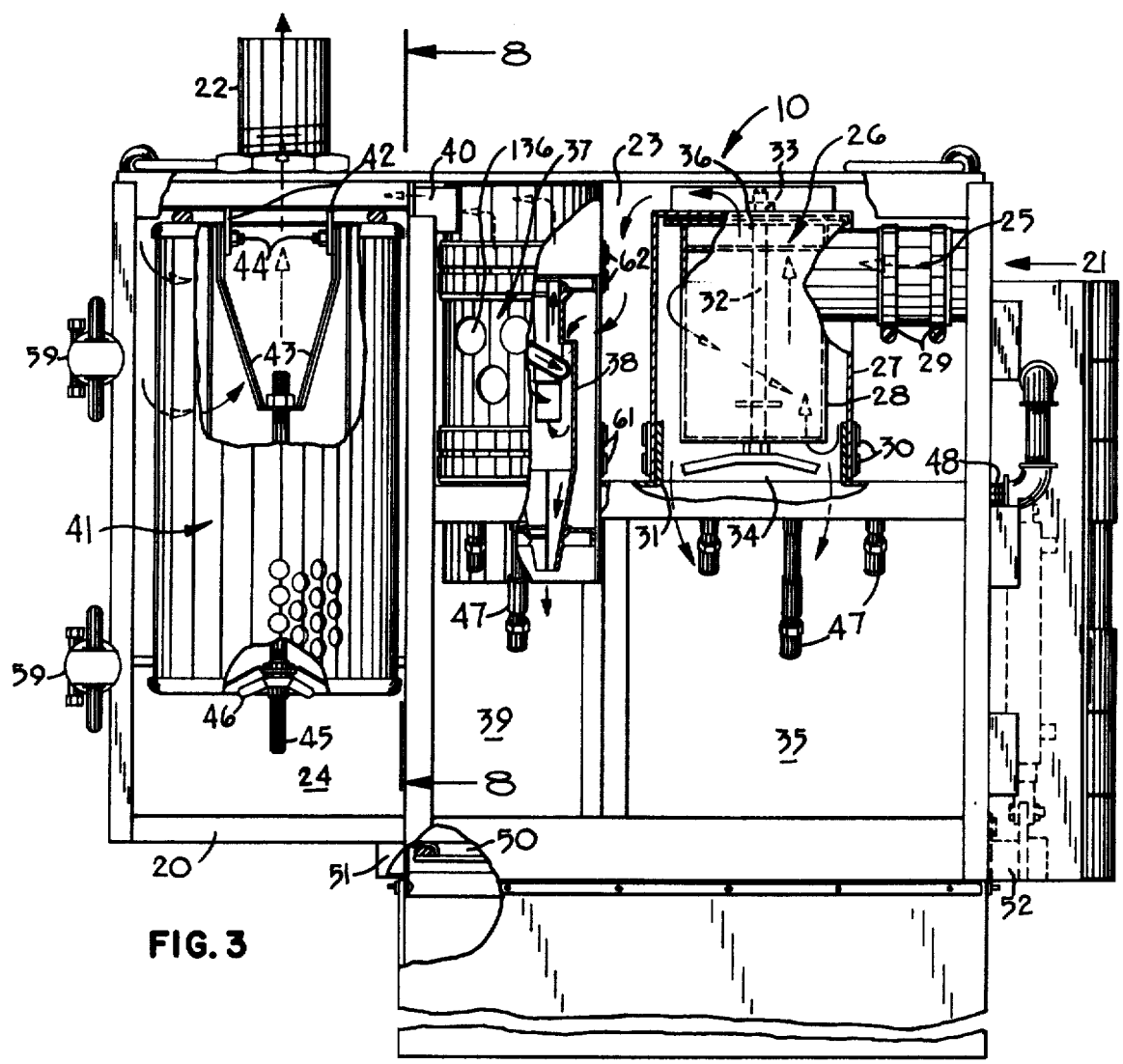
FIG. 3 is a view taken generally along the line 3—3 of FIG. 2, with portions thereof broken away, and portions thereof shown in section.

Referring now to FIGS. 2 and 3, roof drill dust collector 10 is shown in more detail. Roof drill dust collector 10 comprises a substantially closed housing 20, having an inlet 21 and an outlet 22. Inlet 21 is attached to inlet hose 15, whereby dust-laden air may enter housing 20; outlet 22 is attached to outlet hose 16, whereby cleaned air may exit from housing 20. Within housing 20, there is a substantially closed expansion chamber 23 and a substantially closed filter chamber 24. Dust-laden air passes through inlet 21 and communicating passage 25 into a first dust separator 26 which is located within expansion chamber 23. In the preferred embodiment, separator 26 is a cyclone type dust separator, comprising an outer cylindrical sleeve 27, and an inner cylindrical sleeve 28. The entire dust separator 26 is removable from expansion chamber 23 by loosening clamps 29 and clamps 30, which hold outer sleeve 27 on a flange 31 formed integral with the floor of expansion chamber 23. Inner sleeve 28 is removable from outer sleeve 27 by means of bolt 32 and nut 33.

Dust-laden air entering through passage 25 swirls around cyclone 26, whereby over 95% of all incoming dust is removed from the air and deposited, via opening 34, into first substantially closed dust collection chamber 35. Air then passes upward through the inside of inner sleeve 28, through discharge port 36, and into expansion chamber 23.

Dust laden air entering expansion chamber 23 from first separator 26 then passes, via a plurality of entry ports 136 into second dust separator 37, which is mounted in expansion chamber 23. In the preferred embodiment, second stage separator 37 comprises a plurality of DONACLONE tubes: reverse-flow-mini-cyclones, which remove over 84% of the fine dust from the air passing therethrough. The two DONACLONE tubes are generally indicated by the numeral 38. Dust separated in second separator 37 falls into second substantially closed collection chamber 39. Clean air passes upward from second separator 37, through discharge duct 40 into filter chamber 24. Second separator 37 is removable for maintenance by loosening clamps 61 and 62.

First dust separator 26 and first dust collection chamber 35 comprise a first air cleaning stage. Second dust separator 37 and second dust collection chamber 39 comprise a second air cleaning stage. First and second dust collection chambers 35 and 39 comprise a dust collection bin.

Figure 7:
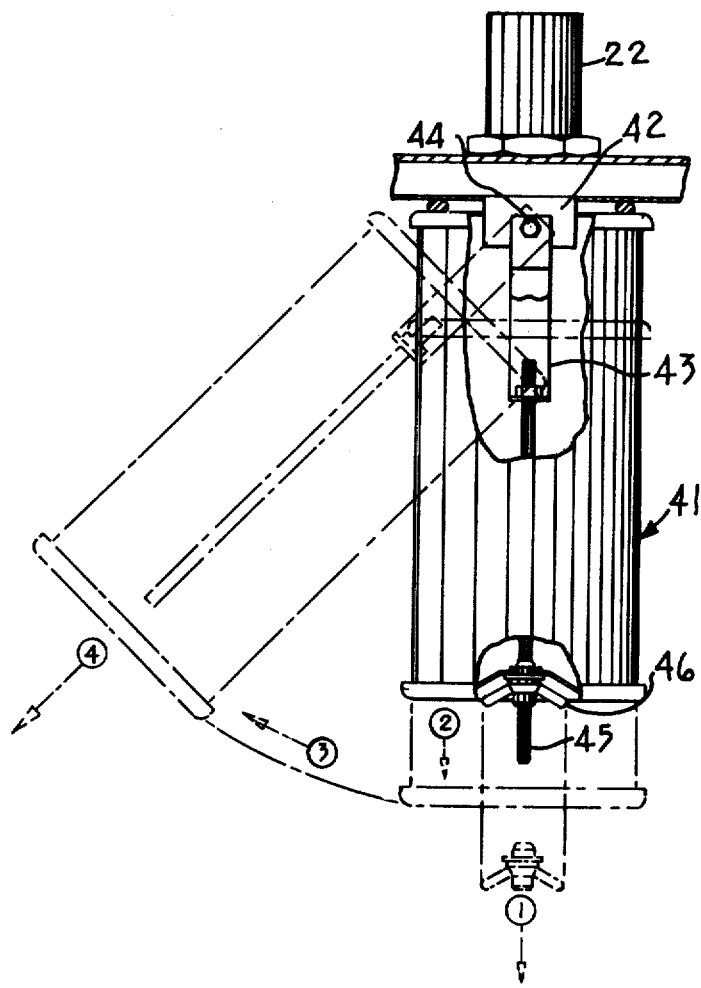
FIG. 7 is a sectional view of a portion of FIG. 3, taken generally along the line 8—8.

Mounted within filter chamber 24 is a dust filter 41. In the preferred embodiment, dust filter 41 comprises a heavy-duty, pleated paper cartridge type element featuring Donaldson DURALIFE II filter media. Air passes through dust filter 41 and then out outlet 22. As shown in FIGS. 2 and 3, dust filter 41 is generally cylindrical, and mounted within dust filter chamber 24 with its longitudinal axis generally vertically oriented, by means of brackets 42, yoke 43, bolts 44, and longitudinal bolt 45 and wing nut 46. As shown in FIG. 7, this arrangement allows dust filter 41 to swing laterally, in order to present itself for easy removal and maintenance. By mounting dust filter 41 vertically, the entire dust collector 10 is provided with a narrower profile, whereby it is better adapted for mounting on drilling machines used in cramped quarters.

Figure 4:
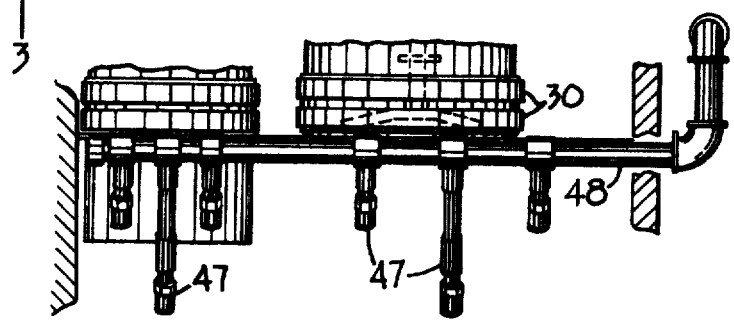
FIG. 4 is a side elevation of a portion of FIG. 3 with portions thereof broken away.

As shown in FIGS. 3 and 4, a plurality of water spray nozzles 47 are directed at the walls of first and second collection chambers 35 and 39. Spray nozzles 47 are connected to a common water supply line 48.

An air line 49 runs into outlet 22 for providing reverse pulses of air through dust filter 41. These reverse air pulses, delivered when the normal air flow has been temporarily discontinued, loosen dust held in filter 41, which dust falls to the floor of filter chamber 24. This filter cleaning feature gives the dust filter a longer, maintenance-free life.

Figure 6:
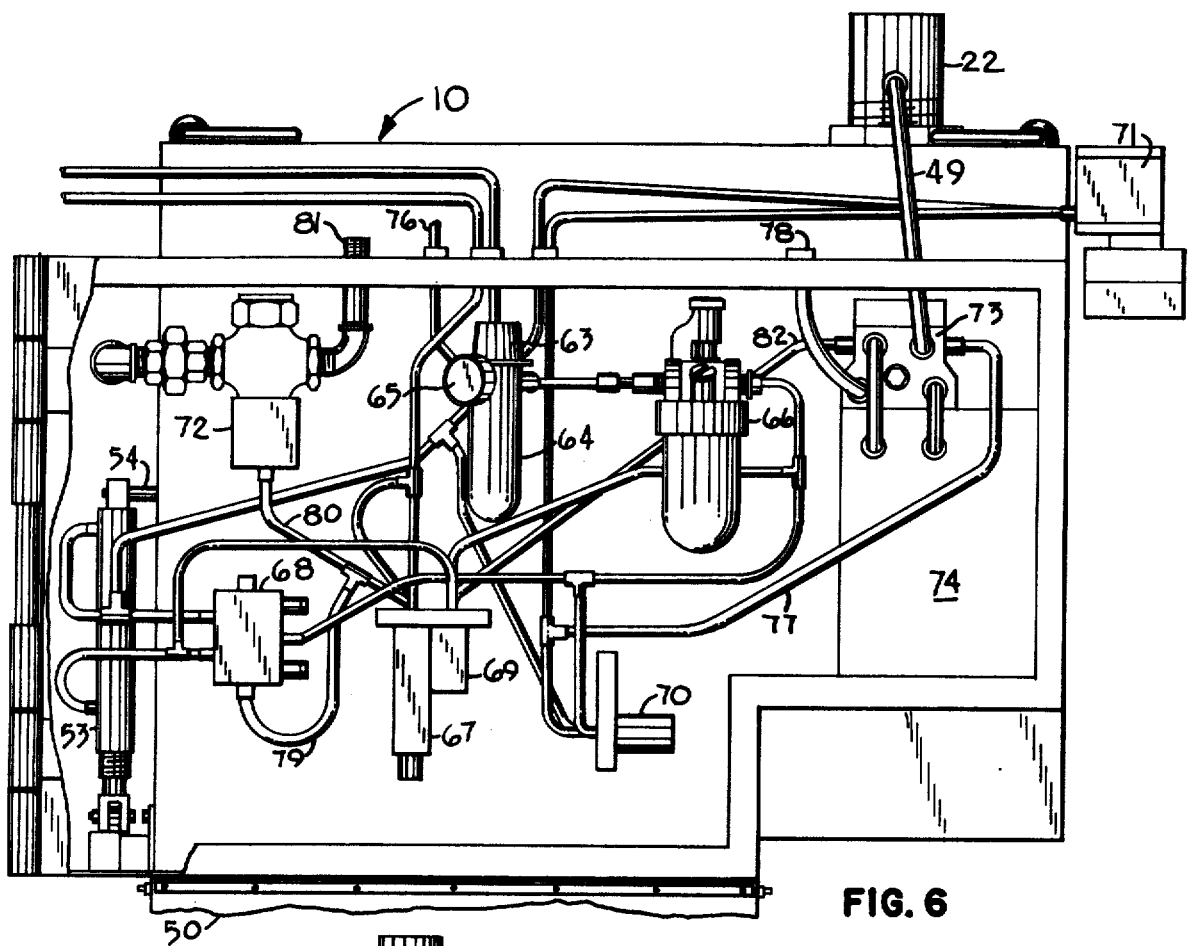
FIG. 6 is a view taken generally along the line 6—6 of FIG. 2.
Figure 5:
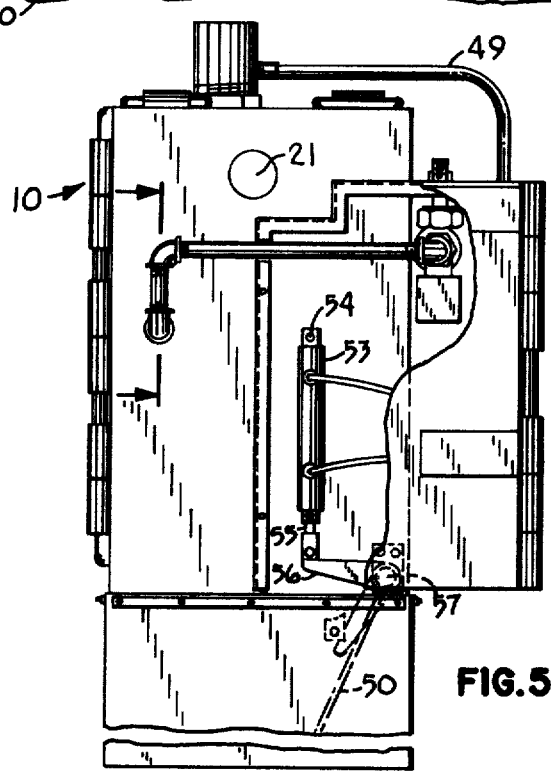
FIG. 5 is a front elevation of the present invention with portions thereof broken away.

The floor of collection chambers 35 and 39 is a trap door 50, mounted to a shaft 57 rotatably mounted at points 51 and 52 on housing 20. An air activated cylinder 53, mounted to pivot around the point 54 is mounted within housing 20, as shown in FIGS. 3, 5, and 6. Piston rod 55 moves crank arm 56, which is keyed to shaft 57, to open and close door 50.

A hinged door 58, equipped with latches 59, provides access to dust collection chambers 35 and 39, expansion chamber 23, and filter chamber 24. A hinged door 60 provides access to the compartment within housing 20 wherein the control circuit is located.

Figure 8:
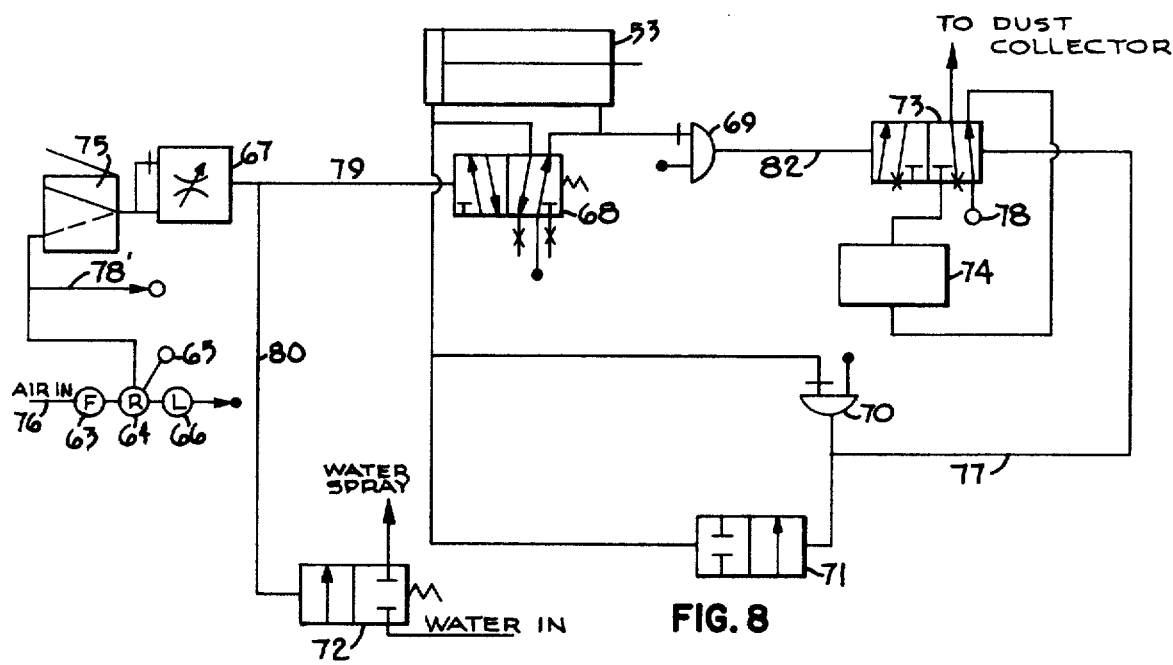
FIG. 8 is a schematic view indicating the operation of the control means of the present invention.

Referring now to FIGS. 6 and 8, there is disclosed the control means of the present invention. The control means performs the following sequence of events when actuated: the normal vacuum within housing 20 is eliminated, water is sprayed down the walls of first and second dust collection chambers 35 and 39 and door 50 is opened, a reverse air pulse is sent through dust filter 41, the water spray is shut off, door 50 is closed, and the vacuum is recreated within housing 20. The control means are pneumatically operated and comprise the following elements, which are indicated in FIG. 6 and schematically indicated by like numerals in FIG. 8: filter 63, regulator 64 and regulator gauge 65, lubricator 66, timer 67, spring-biased valve 68, not element 69, not element 70, vacuum shut off valve 71, spring-biased water spray valve 72, reverse pulse jet valve 73, and accumulator 74. The entire control system is actuated by a limit switch which is not shown in FIG. 6, but which is indicated by the numeral 75 in the schematic FIG. 8. Limit switch 75 is situated at the drill site, where it is easily accessible to the drill operator.

Referring now more specifically to FIG. 8, the operation of the control means will be described. In FIG. 8, the arrows indicate the flow of air through the control system. Closed dots indicate lubricated air, and open dots indicate non-lubricated air. In the "at rest" state of the control system, air flows in through inlet 76, through filter 63, regulator 64, gauge 65, and lubricator 66, to valve 68, not element 69 and not element 70. Lubricated air entering valve 68 passes through that valve to one end of door cylinder 53 and to not element 69. The air flowing into door cylinder 53 keeps door 50 in a closed position at this time. Not elements 69 and 70 are flow valves which allows an air outflow when there is an air supply to only one side of the not element, but do not provide an air outflow when air is supplied to both sides of the not element. Thus, in the control system's rest state, no air passes through not element 69, but a flow of air passes through not element 70 to maintain valve 71 in an open position. Valve 71 is a butterfly valve which when open allows air to be drawn through housing 20 via hose 16 and blower 14, thus maintaining a vacuum within housing 20. In the system's rest state, air passes through not element 70, via control line 77 to pulse jet valve 73. A supply of non-lubricated air is also supplied to pulse jet valve 73 via air inlet 78. This non-lubricated air can be supplied, as indicated in the schematic by a branch line 78' off the main control line running through regulator 64. However, in the preferred embodiment, air is supplied to inlet 78 by a separate supply line, as indicated in FIG. 6. This non-lubricated air passes through valve 73 and into accumulator 74, where pressure is built up preparatory to the discharge of a reverse pulse jet through filter 41.

When the drill operator actuates limits switch 75, air which has flowed through filter 63 and regulator 64 passes through limit switch 75 and into timer 67. Timer 67 is a pneumatically operated, normally open, timer which is adapted to allow air to pass through it for a predetermined length of time. As air passes through timer 67, it passes along control lines 79 and 80 to move valves 68 and 72 to their second positions. In its second position, valve 68 discontinues the supply of lubricated air to the "closed" end of cylinder 53 and allows lubricated air to pass into the "open" end of cylinder 53 whereby door 50 may be opened. A supply of air is also discontinued to one side of not element 69, while at the same time, air is allowed to flow to the "closed" side of vacuum control valve 71, and to not element 70, thereby shutting off the vacuum in the housing 20 and discontinuing the flow along control line 77 to jet pulse valve 73. By virtue of the flow along control line 80 to water spray valve 72, water supply line 81, which is connected to an outside supply of water is opened to send water along line 48 and through spray nozzles 47 into dust collection chambers 35 and 39. By virtue of the additional supply of air to not element 70 and the discontinuity of a supply of air to not element 69, flow along control line 77 is discontinued, and a flow of air along control line 82 is supplied to valve 73, thus temporarily preventing any flow of non-lubricated air through inlet 78 into accumulator 74, and allowing a quick burst of pressurized air to pass from accumulator 74 through valve 73 along line 49 and through filter 41 in filter chamber 24 of dust collector 10. After a set period of time, timer 67 shuts off and the control system is returned to its normal "at rest" position, and is ready to recycle the next time the drill operator hits the limit switch 75. In the preferred embodiment, the entire cycle takes approximately 15 seconds, however, timer 67 is adjustable, and other time periods may be chosen if circumstances so dictate.

It will be appreciated that the foregoing describes a roof drill dust collector which is compact and easily adaptable to mounting on mining equipment for use in close quarters, which provides highly effective cleaning means for separating and filtering dust generated during the roof drilling operation from air to be recycled in the mine environment, and, further, cleans and empties itself without the need for a drill operator to manually dispose of dust collected in the device and thus expose himself to a health hazard which it is an object of the present invention to avoid.

What is claimed is:
1. A roof dust collector comprising:
 (a) a housing having an inlet for dust laden air to enter therein, and an outlet for cleaned air to exit therefrom,
 (b) dust separating means, including at least one cyclone dust separator, within the housing between the inlet and the outlet, said housing having walls forming at least one dust collection chamber in said housing below said dust separating means;
 (c) means within the housing for washing down the walls of the dust collection chamber;
 (d) means including a hinged door in said housing, for emptying the collected dust from said chamber; and
 (e) means, including a limit switch removed from the housing, for actuating said washing and emptying means, and for controlling a cyclic sequence of actuation so that the washing means are only actuated as the collection chamber is being emptied.

2. The roof drill dust collector of claim 1 which further comprises a dust filter between the inlet and outlet, means for establishing a normal air flow in one direction through the housing from the inlet to the outlet, and means for cleaning the dust filter by directing a pulse of air to flow through the dust filter in a direction opposite to the normal air flow.

3. The roof drill dust collector of claim 2 wherein the dust filter has a generally elongated cylindrical shape, and is mounted in the housing with the longitudinal axis of the cylinder oriented generally vertically.

4. A roof drill dust collector comprising:
 (a) a housing having an inlet for dust-laden air to enter therein, and an outlet for cleaned air to exit therefrom, said outlet being in communication with means for establishing a normal air flow through said housing from the inlet to the outlet;
 (b) means defining chamber within the housing, said filter chamber being in communication with the clean air outlet, and having an air filter disposed therein;
 (c) dust separation means, including at least one cyclone dust separator, disposed within the housing for separating dust from the air entering therein, said dust separation means being in communication with the housing inlet and the filter chamber;
 (d) means within the housing, including duct means, for directing the normal air flow from the housing inlet into the dust separation means, from the dust separation means into the filter chamber, and through the filter before exiting through the housing outlet;

(e) means, including walls, defining a dust collection bin, said bin being in communication with the dust separation means, whereby dust separated in said separation means is deposited in the bin;

(f) a hinged door on the housing, said door being a floor on the dust collection bin;

(g) means for opening and closing the hinged door;

(h) means for directing a plurality of sprays of water at the walls of the collection bin; and (i) pneumatic control means for actuating the collection bin water spraying means and the door opening and closing means in a sequence whereby the walls of the bin are sprayed generally during the period of time in which the door is open, and are not sprayed during the period of time in which the door is closed.

5. The roof drill dust collector of claim 4 which further comprises means for intermittently directing pulses of air through the air filter in a direction opposite to the normal air flow direction, to clean the filter.

6. An automatically cleaning and emptying roof drill dust collector comprising:

(a) a closed housing having an inlet for dust-laden air to enter therein, and an outlet for cleaned air to exit therefrom, said outlet being in communication with means for establishing a vacuum within said housing to create a normal air flow therethrough;

(b) means defining an expansion chamber within the housing;

(c) means defining a filter chamber within the housing, said filter chamber being in communication with the clean air outlet;

(d) a first air cleaning stage comprising,
  (i) a first dust separator disposed within the expansion chamber, through which all dust-laden air entering the housing initially passes, said first dust separator having an inlet opening connected to said first housing inlet and a discharge port in communication with the expansion chamber;
  (ii) means, including walls, defining a first dust collection chamber in communicating relationship with the first dust separator, in which dust separated from the dust-laden air passing through the first dust separator is collected;

(e) a second air cleaning stage comprising,
  (i) a second dust separator disposed within the expansion chamber, through which all dust-laden air which has passed through the first dust separator flows, said second dust separator having at least one entry port communicating with the expansion chamber, and a discharge duct in communication with said filter chamber;
  (ii) means, including walls, defining a second dust collection chamber in communicating relationship with the second dust separator, in which dust separated from the dust-laden air passing through the second dust separator is collected;

(f) a dust filter located within the filter chamber between the discharge duct and the clean air outlet, through which dust-laden air normally flows;

(g) washing means for directing a plurality of sprays of water at the walls of the first and second dust collection chambers;

(h) cleaning means for intermittently directing pulses of air through the air filter in a direction opposite to the normal air flow direction to clean the air filter;

(i) a hinged door on the housing, said door being a floor on the first and second dust collection chambers;

(j) door operating means within the housing for opening and closing the door; and (k) control means within the housing for actuating and deactuating the recited vacuum establishing, washing, cleaning, and door operating means in a predetermined sequence.

7. The collector of claim 6 wherein the first dust separator comprises a generally cylindrical cyclone dust separator having a first cross-sectional diameter, and having an open bottom end providing means for communication between the dust separator and the first dust collection chamber.

8. The roof drill dust collector of claim 7 wherein the second dust separator comprises a plurality of generally cylindrical, cyclone dust separators, each said cyclone of the second dust separator having a second cross-sectional diameter which is less than said first cross-sectional diameter, and having an open top end providing means of communication between said cyclones and the discharge duct, and an open bottom end providing means for communication between the second dust separator and the second dust collection chamber.

9. The roof drill dust collector of claim 8 wherein the dust filter comprises a heavy-duty, pleated paper cartridge filter element.

10. The roof drill dust collector of claim 6 which further comprises a hinged, side door on the housing, said side door providing access to the expansion chamber, and the first and second dust collection chambers, and wherein the first dust separator, second dust separator, and dust filter are removable for maintenance.

11. The roof drill dust collector of claim 10 wherein the dust filter is in the shape of a generally elongated cylinder having a longitudinal axis, and wherein the dust filter is mounted within the filter chamber with its longitudinal axis generally vertically oriented, the filter being hingedly mounted to permit it to be swung out of the filter chamber when the side door is opened.

12. The roof drill dust collector of claim 6 wherein the dust filter is in the shape of a generally elongated cylinder having a longitudinal axis, and wherein the dust filter is mounted within the filter chamber with its longitudinal axis generally vertically oriented.

* * * * *